(12) United States Patent
Dupree et al.

(10) Patent No.: US 7,287,522 B2
(45) Date of Patent: Oct. 30, 2007

(54) ENGINE SYSTEM HAVING CARBON FOAM EXHAUST GAS HEAT EXCHANGER

(75) Inventors: Ronald L. Dupree, Washington, IL (US); Brandon Dykstra, Peoria, IL (US); James J. Callas, Peoria, IL (US); Kevin L. Martin, Washburn, IL (US)

(73) Assignee: Caterpillar Inc., Peoria, IL (US)

( * ) Notice: Subject to any disclaimer, the term of this patent is extended or adjusted under 35 U.S.C. 154(b) by 22 days.

(21) Appl. No.: 11/319,024

(22) Filed: Dec. 27, 2005

(65) Prior Publication Data

US 2007/0144500 A1 Jun. 28, 2007

(51) Int. Cl.
*F02M 25/07* (2006.01)
*F02B 47/08* (2006.01)
*F28F 13/18* (2006.01)

(52) U.S. Cl. .................... 123/568.12; 165/133

(58) Field of Classification Search ............. 123/41.31, 123/568.12, 569.12, 196 AB, 41.33; 165/41, 165/51, 103, 133, 177, 179; 423/448; 60/320, 60/321
See application file for complete search history.

(56) References Cited

U.S. PATENT DOCUMENTS

| | | |
|---|---|---|
| 6,430,935 B1 | 8/2002 | Klett et al. |
| 6,673,328 B1 | 1/2004 | Klett et al. |
| 6,729,269 B2 | 5/2004 | Ott et al. |
| 6,929,866 B1 | 8/2005 | Williams et al. |
| 6,971,377 B2 * | 12/2005 | Moyer et al. ........... 123/568.12 |
| 7,080,634 B2 * | 7/2006 | Yamashita ............. 123/568.12 |
| 7,171,956 B2 * | 2/2007 | Igami et al. ........... 123/568.12 |
| 2003/0000486 A1 * | 1/2003 | Ott et al. ................. 123/41.31 |
| 2003/0015184 A1 * | 1/2003 | Klipfel et al. ......... 123/568.12 |
| 2003/0168730 A1 | 9/2003 | Davidson |
| 2003/0175201 A1 * | 9/2003 | Klett et al. ................. 423/448 |
| 2004/0123980 A1 * | 7/2004 | Queheillalt et al. ......... 165/133 |
| 2004/0221603 A1 | 11/2004 | Arik et al. |
| 2005/0031504 A1 | 2/2005 | Armstrong et al. |

FOREIGN PATENT DOCUMENTS

| | | |
|---|---|---|
| FR | 2704277 | 10/1994 |
| FR | 2856747 | 12/2004 |
| WO | WO 98/04814 | 2/1998 |
| WO | WO 99/11586 | 3/1999 |

OTHER PUBLICATIONS

Klett, Conway, Thermal Management Solutions Utilizing High Thermal Conductivity Graphite Foams; Carbon and Insulation Materials Technology Group, Metals and Ceramics Division, Oak Ridge National Laboratory, Oak Ridge TN, 37831-6087; Performance Research, Inc., 3684 Delling Downs Road; Denver, NC 28037; pp. 1-11.

* cited by examiner

*Primary Examiner*—Willis R. Wolfe, Jr.
(74) *Attorney, Agent, or Firm*—Liell & McNeil

(57) ABSTRACT

An engine system includes an engine such as a compression ignition internal combustion engine, including a heat exchanger in an exhaust system thereof. The heat exchanger including at least one carbon foam block for cooling exhaust gas with cooling air. An exhaust system segment includes a carbon foam based heat exchanger configured to exchange heat between exhaust gas and cooling air at least in part via the carbon foam.

20 Claims, 4 Drawing Sheets

ENGINE SYSTEM HAVING CARBON FOAM EXHAUST GAS HEAT EXCHANGER

STATEMENT OF GOVERNMENT INTEREST

The United States Government has certain rights in the present patent application, and any patent that may issue thereon, under DOE Contract No. DE-AC05-00OR22725.

TECHNICAL FIELD

The present disclosure relates generally to engine systems, and more particularly to an engine system having an internal combustion engine with a carbon foam gas to gas heat exchanger disposed in an exhaust system thereof.

BACKGROUND

Operation of engines such as internal combustion engines produces a variety of exhaust gas emissions, including carbon dioxide, carbon monoxide, unburned hydrocarbons and various nitrogen-oxygen compounds, known in the art collectively as "NOx." In recent years, certain jurisdictions have implemented plans to reduce allowable limits on the relative amounts of certain exhaust gas emissions of particular concern. The present and upcoming restrictions have prompted engineers to further research known engine and exhaust systems, and have driven a search for new strategies for exhaust gas treatment and engine operation showing promise for a reduction in certain emissions.

Control over the relative amounts of various compounds in engine exhaust gas has been attempted in numerous different ways. In some four-cycle engines, for example, the relative timing of intake, exhaust, compression and expansion strokes are varied to control combustion phasing within the engine cylinders and therefore affect the relative amounts of certain emissions. In other designs, combustion exhaust is treated by chemical means in an aftertreatment system to generate a desired emissions profile.

One technology that has received increasing attention involves recirculation of exhaust gas back into the engine intake pathway, known in the art as "EGR." In such an approach, a portion of the relatively inert exhaust gas from the engine's exhaust manifold is returned to the intake manifold. Among other things, the addition of exhaust gas to the fuel and air mixture in an engine cylinder can provide an inert gas heat sink that allows combustion to proceed at a relatively cooler temperature than might otherwise be practicable. EGR-related technologies have become increasingly prevalent in diesel engines in particular.

The exhaust gas recirculation apparatus, commonly known as an EGR loop, may include a valve-controlled passage extending between an exhaust system of the engine and the intake manifold. In certain instances, it has been found to be desirable to cool the recirculated exhaust gas prior to supplying it to the intake manifold. In turbocharged engines, it may be desirable to combine exhaust gas with combustion air upstream from the compressor. When the exhaust gas and air mixture is compressed via the turbocharger compressor, it will increase in temperature. Cooling the exhaust gas prior to compression allows the temperature of the mixture ultimately delivered to the intake manifold to be maintained at more manageable and more desirable levels than would occur where the exhaust gas arrives at the compressor without first being cooled.

Various exhaust gas cooling devices are known which are disposed within the EGR loop. One common device includes an apparatus known in the art as a "tube-in-shell" heat exchanger. A conventional tube-in-shell heat exchanger includes a passage for exhaust gas, which is thermally coupled with one or more passages carrying cooling water or engine coolant. The engine coolant/water is circulated through the heat exchanger, exchanging heat with the exhaust gas passing therethrough, and thenceforth returned to the engine radiator for cooling in a conventional manner.

While designs similar to those above have experienced a certain level of technical and commercial success, there are limitations to the efficacy and durability of conventional heat exchangers. For instance, a coolant or water-cooled heat exchanger requires a relatively complex plumbing system connecting with the main radiator assembly of the engine. In addition, a typical engine radiator can be limited in its capacity to dissipate heat from the engine. Adding a subsystem such as an exhaust gas cooler can increase the heat load of the radiator above that which is desirable. Heightened emissions regulations have further compounded this problem, as in certain operating strategies it is actually desirable to reject more heat from the engine than was traditionally required. While some manufacturers have attempted to increase the size of engine radiators to provide more heat rejection capacity, engines and associated cooling systems are commonly sized and positioned in such a way that they cannot readily be reconfigured to accommodate larger radiators. Moreover, increasing the size of radiators, as well as using overly large and heavy conventional exhaust gas coolers adds undesirable weight to a work machine using such an engine as its power source.

Yet another problem plaguing engineers is the tendency for conventional exhaust gas coolers to suffer degradation due to corrosive, condensed exhaust gases. As exhaust gases are cooled, a certain proportion of the gases may actually condense to an acidic liquid. Such liquids are known to be corrosive to metals, and can reduce the effectiveness of a conventional exhaust gas cooler as well as reduce its operating life.

Another problem with engine coolant based EGR coolers are limitations on exhaust gas exit temperatures which may be imposed by the engine coolant. The engine coolant will often be maintained at a minimum temperature by an engine coolant thermostat, often in the range of 85° C. to 90° C. This effectively limits the temperature of exhaust gas exiting the exhaust gas cooler to a range above about 90° C. An air based EGR cooler can provide lower temperatures for exhaust gases leaving the cooler and entering the turbocharger, which can result in greater air density, and hence better engine performance. Typical air cooled exhaust gas heat exchangers, like an air to air aftercooler, depend upon a cooling flow of 5 lb or more per 1 lb of hot gas to provide the required cooling function.

Still another problem with engine coolant based EGR coolers is the potential for engine coolant to leak into the exhaust gas passages, or for exhaust gases to leak into the engine coolant passages. In either case, leakage of one fluid into another passage can be detrimental to the life of the engine.

The present disclosure is directed to one or more of the problems or shortcomings set forth above.

SUMMARY OF THE INVENTION

In one aspect, the present disclosure provides an engine system including an engine, and an exhaust system coupled with the engine. A heat exchanger is coupled with the exhaust system and includes a heat conducting carbon foam, an exhaust gas passage and a second passage. The exhaust gas passage and the second passage are configured to exchanger heat between fluids therein at least in part via the foam.

In another aspect, the present disclosure provides a combustion exhaust system segment including a housing with a first fluid passage and a second fluid passage. A heat conducting carbon foam is disposed within at least one of the first and second fluid passages, and is configured to exchange heat with a fluid in the other of the first and second fluid passages.

In still another aspect, the present disclosure provides a method of exchanging heat between a combustion exhaust gas and another fluid. The method includes, passing high temperature combustion exhaust gas through a first passage, and passing low temperature fluid through another passage. The method further includes, exchanging heat between the high temperature combustion exhaust gas and the low temperature fluid at least in part via a heat conducting carbon foam.

DETAILED DESCRIPTION

Figure 1:
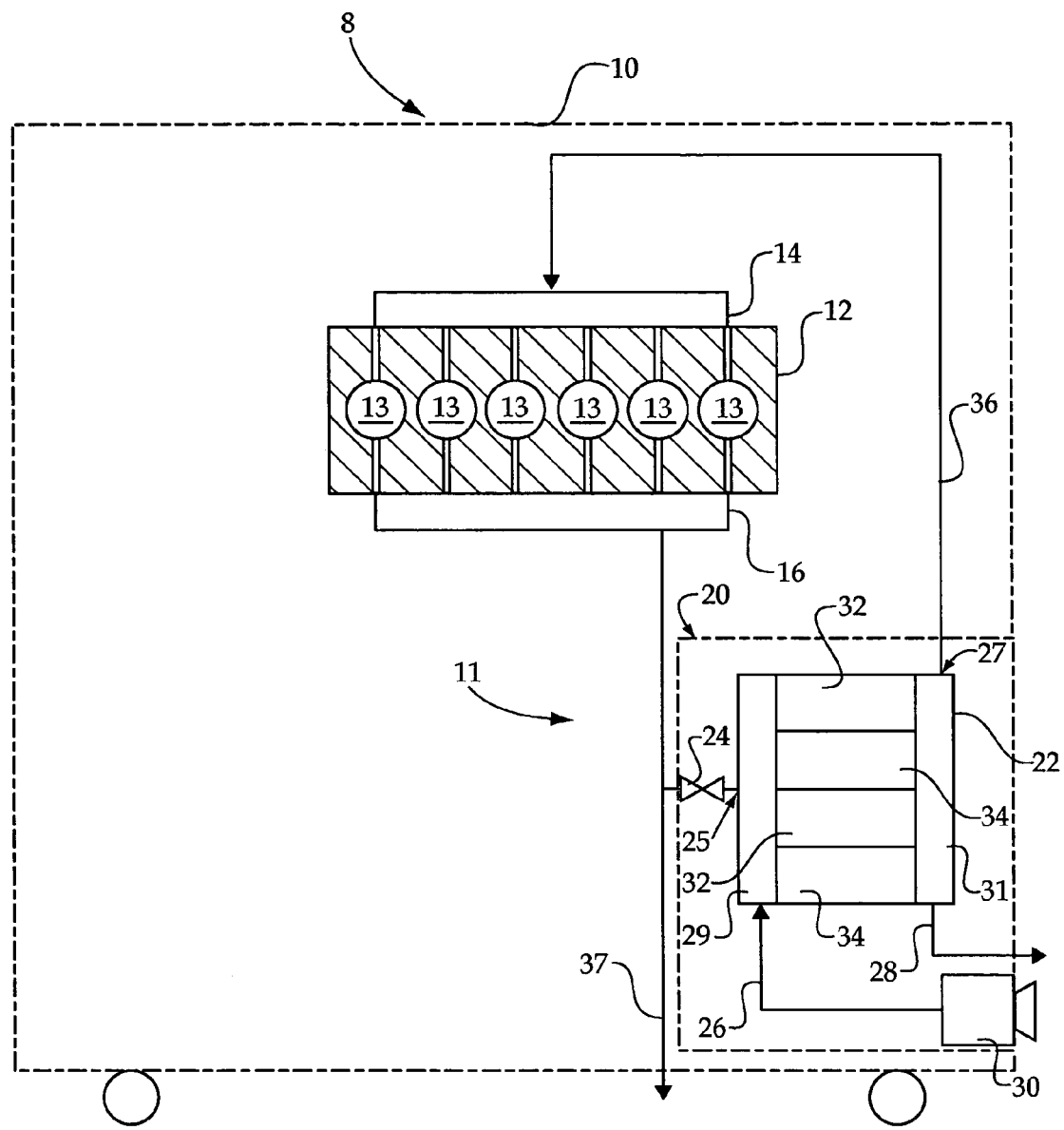
FIG. 1 is a schematic view of a work machine having an engine system according to the present disclosure.

Referring to FIG. 1, there is shown a work machine 8 having a work machine body 10. An engine system 11 is coupled with work machine body 10 and includes an engine 12 and an exhaust system 20. Work machine 8 may be virtually any type of conceivable work machine having an engine, however, it is contemplated that work machines such as on-highway trucks, off-highway trucks, loaders, tractors, excavators, etc. will particularly benefit through the teachings of the present disclosure. Engine 12 may be an internal combustion engine such as a compression ignition diesel engine, however, other engine types such as spark ignited gasoline or gaseous fuel engines, and gas turbine engines are contemplated herein. In the embodiment shown in FIG. 1, exhaust system 20 will include a heat exchanger 22 operable to exchange heat between a fluid such as cooling air and exhaust gas recirculated from an exhaust manifold 16 of engine 12 to an intake manifold 14 thereof.

Heat exchanger 22 may be disposed within an exhaust gas recirculation passage or loop 36 connecting with an exhaust outlet passage 37 which in turn connects with exhaust manifold 16. Heat exchanger 22 includes an exhaust inlet 25 and an exhaust outlet 27, which may be understood as defining a segment of exhaust system 20. Although it is contemplated that the present disclosure will be particularly applicable to engine systems wherein exhaust gas is cooled during recirculation, it is not thereby limited and could be implemented where exhaust gas is cooled for some other purpose. Further, while much of the present description discusses "cooling" of exhaust gas, those skilled in the art will appreciate that the air or other fluid which cools the exhaust gas will itself be heated. In certain contemplated embodiments, the operation of interest could actually be the heating of air rather than the cooling of exhaust gas.

A control valve 24 may be disposed between exhaust outlet passage 37 and heat exchanger 22 to selectively connect and/or adjust the connection therebetween. Heat exchanger 22 may comprise a plurality of separate units including exhaust gas and cooling air units arranged in a stacked alternating fashion. In the embodiment of FIG. 1, for example, heat exchanger 22 includes two exhaust gas units 32 and two cooling air units 34 stacked together. Exhaust gas units 32 and cooling air units 34 each define an internal fluid passage such as an exhaust gas passage and a cooling air passage, respectively, as described herein. The respective exhaust gas and cooling air passages will typically be fluidly isolated from adjacent passages.

A first manifold assembly 29 specific to heat exchanger 22 is coupled therewith and may be configured to direct exhaust gas from inlet 25 to each of exhaust gas units 32. First manifold assembly 29 may further be configured to separately direct cooling air from a cooling air supply passage 26 to each of cooling air units 34. The internal plumbing of first manifold assembly 29 is not shown, however, suitable designs are well known to those skilled in the art. Cooling air may be provided to supply passage 26 from a cooling air intake 30. Intake 30 may include a supply fan (not shown), for example. Alternatively, intake 30 might be coupled with an intake air system of engine 12 to supply ambient air or cooled air from a turbocharger, for example. Further still, a suitable fluid other than cooling air might be used. It is anticipated that the flow of cooling air may be varied, either by the means of an external control valve, or by varying the speed of the supply fan to both maintain the required exhaust gas outlet temperature, and minimize the condensation of liquids in the heat exchanger. A second manifold assembly 31 specific to heat exchanger 22 may be coupled therewith and positioned opposite first manifold 29. Second manifold assembly 31 may be configured similarly to first manifold assembly 29 to direct cooled exhaust gases out exhaust outlet 27 and to intake manifold 14 via passage 36, and to direct cooling air out of heat exchanger 22 via a cooling air discharge passage 28.

Figure 2:
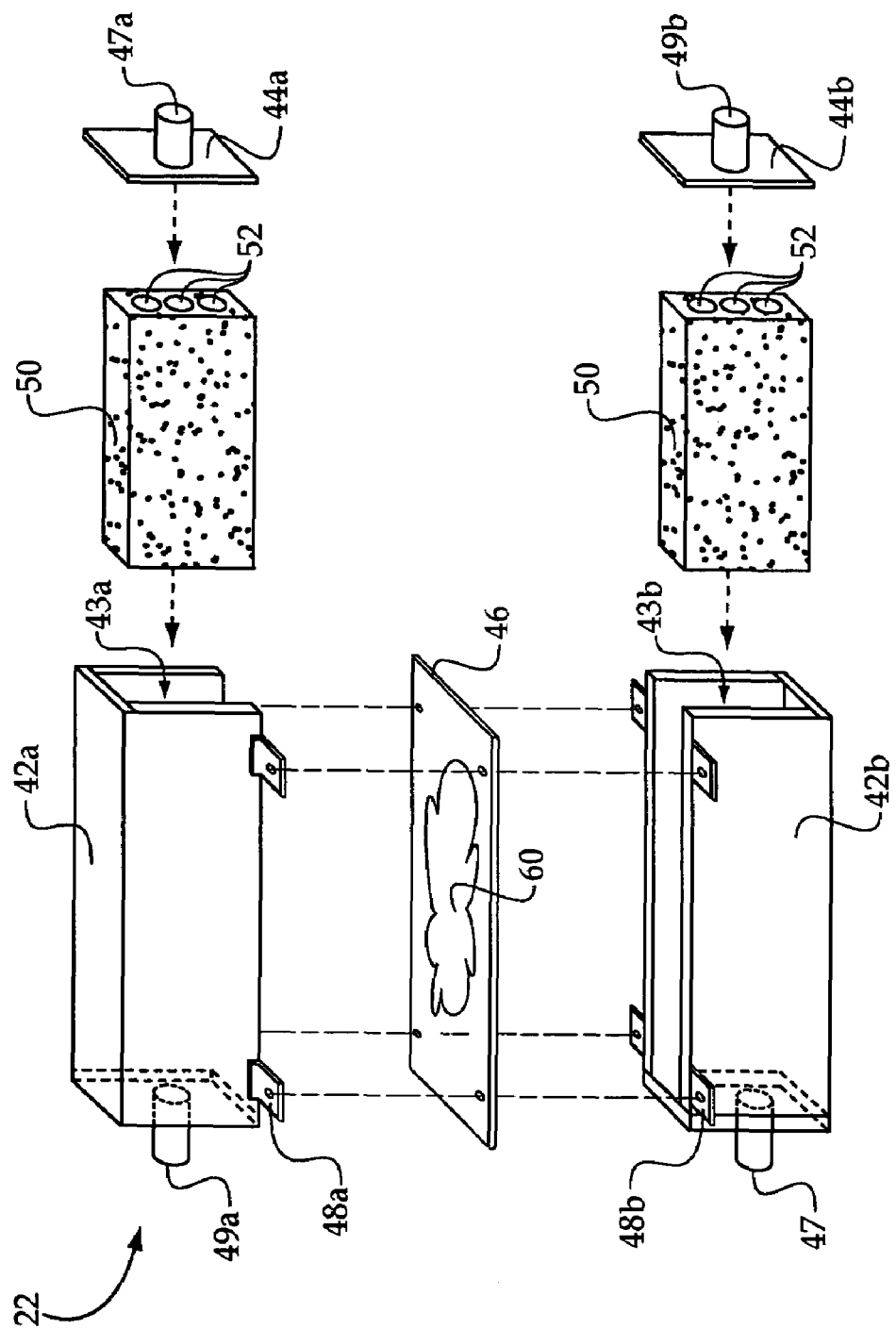
FIG. 2 is an exploded perspective view of a heat exchanger suitable for use in an exhaust system segment according to one embodiment of the present disclosure.

Turning now to FIG. 2, there is shown an exploded view in perspective of certain components of a heat exchanger 22 similar to the heat exchanger shown in FIG. 1. Heat exchanger 22 includes a first housing portion 42a and a second, similar or identical housing portion 42b. Each of housing portions 42a and 42b may be fabricated from a plurality of metallic plates, such as stainless steel plates, to form an elongate box structure having an open side. Alternatively, each of housing portions 42a and 42b could be formed from a flat metal sheet stamped or otherwise bent into the desired configuration. Although a generally rectangular configuration presents one practical implementation strategy, the illustrated design is by no means limiting. End plates 44a and 44b, also made from stainless steel or another suitable material may be disposed at each end of housings 42a and 42b, respectively, and affixed thereto by any suitable means. Each of housing portions 42a and 42b, in combination with end plates 44a and 44b and a separator plate 46, described herein, may form a separate fluid passage extending therein, one of which may serve as an exhaust passage, with the other serving as a cooling fluid passage. A carbon foam will typically be disposed in at least one of the fluid passages to exchange heat between the fluids passed therethrough. In the embodiment of FIG. 2, a generally rectangular carbon foam block 50 may be slidably positioned within each of housing portions 42a and 42b.

Separator plate 46 may be disposed between housing portions 42a and 42b. Separator plate 46 may be fabricated from a similar material to housing portions 42a and 42b, or it might comprise another, suitably thermally conductive material. The open sides of each of housing portions 42a and 42b may face separator plate 46 as shown, and the components stacked and secured via assembly/mounting tabs 48a and 48b disposed on each of housing portions 42a and 42b, and a plurality of fasteners (not shown). A suitable thermally conductive adhesive 60, a variety of which are known to those skilled in the art, may be disposed on opposite sides of separator plate 46, such that carbon foam blocks 50 are adhered and thermally coupled therewith. Separator plate 46 may thereby exchange heat between carbon foam blocks 50, and correspondingly between fluids in each of housing portions 42a and 42b.

Once assembled, housing portion 42a, one of blocks 50, end plates 44a and separator plate 60 define a first fluid passage 43a through housing portion 42a, having an exhaust inlet 47a and an exhaust outlet 49a, for example. Housing portion 42b, the other of blocks 50, end plates 44b and separator plate 60 define a second fluid passage 43b having a cooling-air inlet 47b and a cooling air outlet 49b, for example. The respective fluid passages may be fluidly isolated via separator plate 46. In alternative embodiments, separator plate 60 might be omitted from the design and some other means of fluidly sealing passages 43a and 43b, as well as fluidly isolated passages 43a and 43b from one another, might be used. In one practical implementation strategy, cooling air and exhaust gas will be passed through passages 43a and 43b in counter flow, a known strategy.

In other embodiments, however, the cooling air and exhaust gas could be passed through in the same direction, or in orthogonal directions, for example.

Although only two housing portions are shown in FIG. 2, it should be appreciated that any number of housing portions, each separated from adjacent portions with a separator plate or fluidly separated by another means, may be used. In this manner, a heat exchanger having a desired volumetric throughput capacity for relatively larger or relatively smaller engines may be assembled. In addition, where more heat exchange surface area is desired to increase cooling efficacy for a given size engine, additional housing portions/modules could be used. In an embodiment having more than the two illustrated modules, each housing portion could be constructed such that it is open on both a top side and a bottom side, prior to assembly.

Carbon foams suitable for use in an engine system according to the present disclosure may be derived from pitch-based graphite foams, a variety of which are known and available from commercial sources known to those skilled in the art. In one contemplated configuration, carbon foam blocks 50 may be cut to shape from a larger piece of carbon foam. Alternatively, carbon foam blocks 50 may be molded to a desired configuration and specifications during manufacturing. In either event, it is contemplated that it will be desirable to provide passages 52 extending through blocks 50 such that fluid may be passed through each respective block without a prohibitive pressure drop. Passages 52 may be molded in the carbon foam manufacturing process, or may be machined therein. In the case of exhaust gas, for example, too high a pressure drop through a heat exchanger may interfere with successfully supplying the recirculated exhaust gas to the intake system of the engine, or generate other problems.

Figure 4:
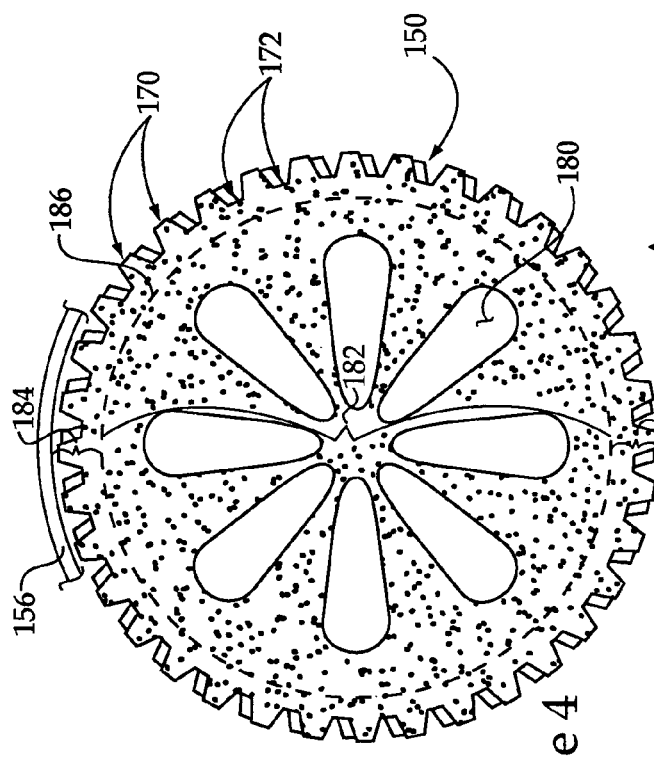
FIG. 4 is an end view of a carbon foam block suitable for use with the heat exchanger of FIG. 3.
Figure 3:
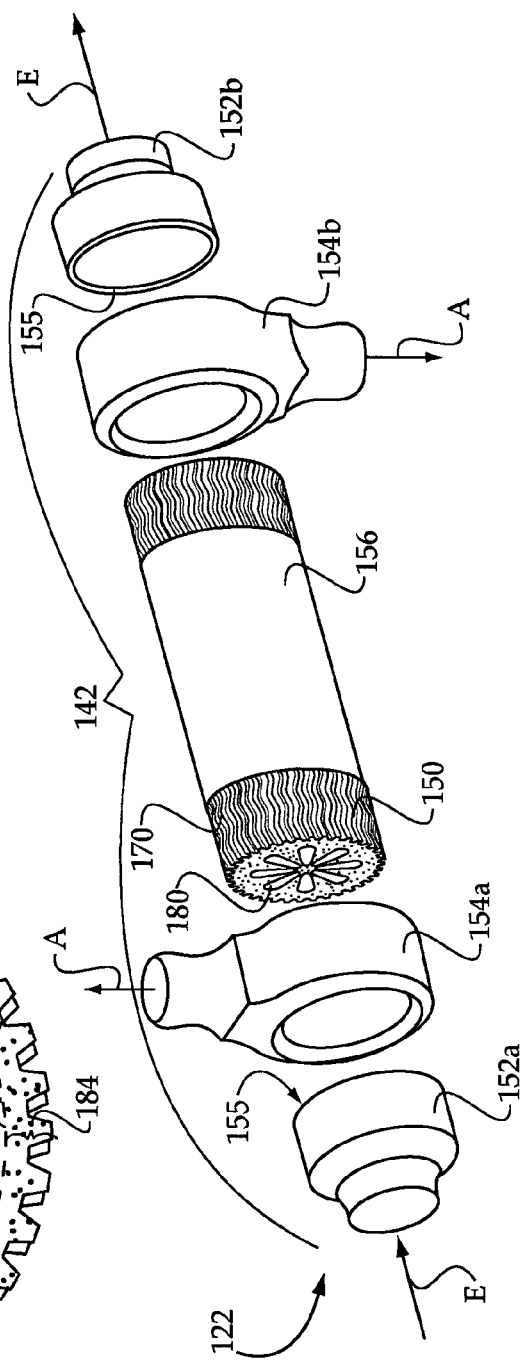
FIG. 3 is an exploded perspective view of a heat exchanger suitable for use in an exhaust system segment according to another embodiment of the present disclosure.
Figure 5:
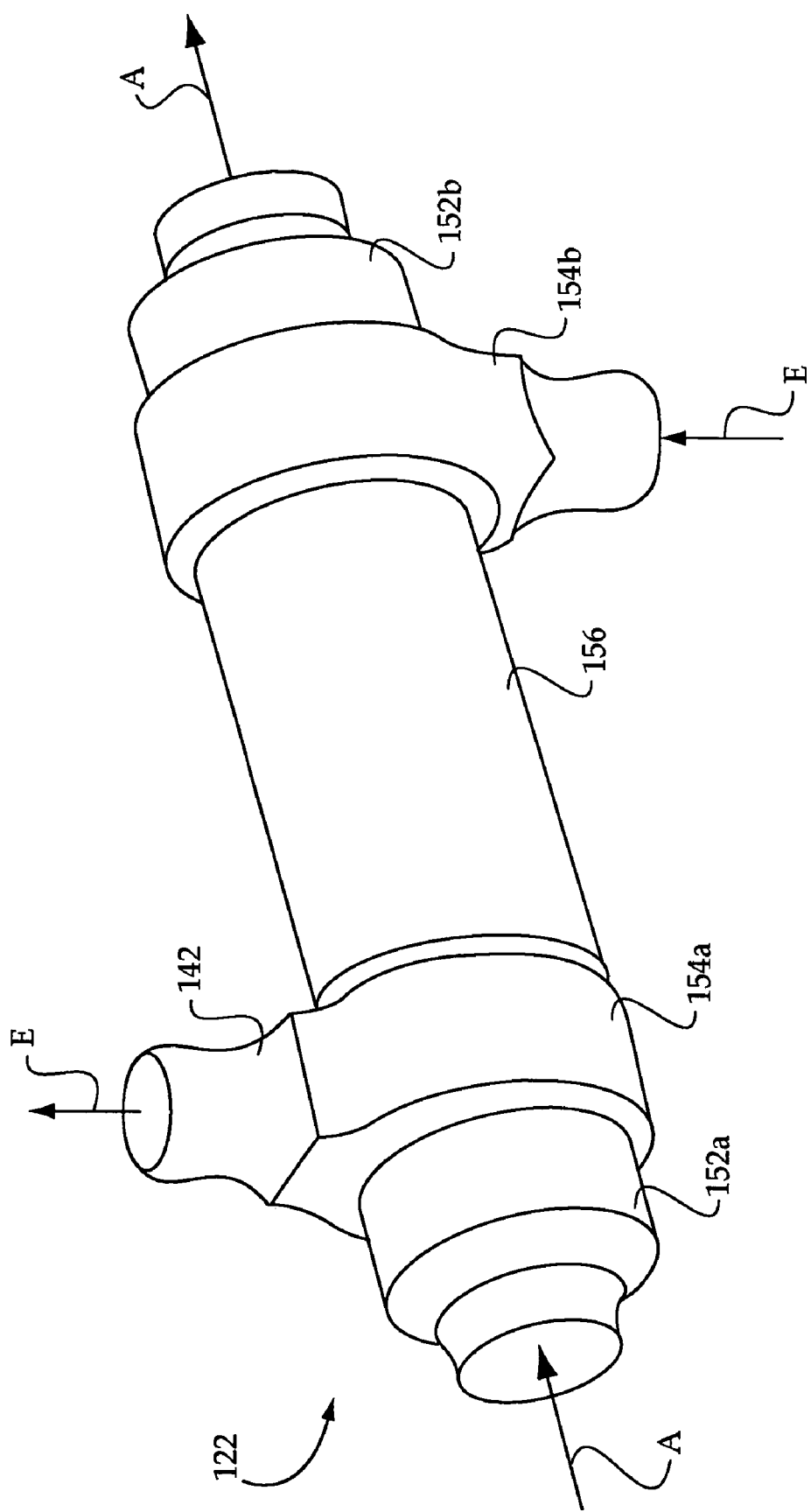
FIG. 5 is a perspective view of an assembled heat exchanger similar to the embodiment of FIG. 3.

Although it is contemplated that the rectangular, modular structures shown in FIG. 2 represent one practical implementation strategy for a heat exchanger suitable for use in the context of the present disclosure, it is not thereby limited. One alternative design for a heat exchanger 122 is shown in FIGS. 3, 4 and 5. The embodiment of FIG. 4 may be used in a manner similar to that of the foregoing embodiments, however, there are several important differences. For instance, rather than providing adjacent exhaust gas and cooling air passages, heat exchanger 122 provides two fluid passages extending in a coaxial arrangement, as described herein. Rather than a stackable, modular construction, heat exchanger 122 may be a unitary assembly that is plugged into an existing exhaust gas recirculation loop, or other heat exchanger application different from exhaust gas and even internal combustion applications. In some applications, more than one heat exchanger similar to heat exchanger 122 might be arranged in fluid series to provide plural successive cooling or heating stages for a fluid of interest.

The fluid passages may be defined in part by the various housing portions of heat exchanger 122, and also in part by a carbon foam, as described herein. Heat exchanger 122 will thus include a housing 142 having a plurality of components configured to fit together into a unit, as generally shown in the assembled version illustrated in FIG. 5. Housing 142 includes an air inlet portion 152a and an air outlet portion 152b. Arrows A in FIG. 3 illustrate an approximate direction of cooling air flow, whereas arrows E identify a counter-oriented exhaust gas flow, although heat exchanger 122 is not thereby limited. Housing 142 further includes an exhaust inlet portion 154a and an exhaust outlet portion 154b, configured to couple with air inlet and outlet portions 152a and 152b, respectively. A tube 156 is further provided and configured to couple with and between each of exhaust inlet and outlet portions 154a and 154b. Tube 156 and the other portions of housing 142 may be constructed from plastic, metal or some other suitable material or composite.

Similar to the embodiment described with respect to FIGS. 1 and 2, heat exchanger 122 may include a carbon foam disposed within at least one of its respective passages, and configured to exchange heat between fluids therein. The carbon foam used in the embodiment of FIGS. 3-5 may comprise a carbon foam block 150 disposed at least partially within tube 156. As also shown in FIG. 4, carbon foam block 150 may include a plurality of external curving ridges 170 extending longitudinally. A plurality of channels 172 are disposed between adjacent ones of ridges 170 and also extend longitudinally. Carbon foam block 150 may also include a plurality of internal longitudinal passages 180 to reduce the pressure drop experienced by fluid as it passes through foam block 150.

FIG. 4 illustrates an end view of foam block 150, and a portion of tube 156. In the embodiment shown in FIG. 4, an internal cylindrical wall 186 extends longitudinally in foam block 150, and fluidly separates an inner passage 182 from an outer passage 184. Wall 186 may be an integral, structural aspect of foam block 150 that is a different physical form of the same carbon material making up the rest of block 150, as described herein. Alternatively, wall 186 might comprise a material different from the rest of foam block 150, such as a cylindrical sleeve or a flowable, curable material applied during manufacturing of block 150.

Referring in particular to FIG. 4, the first fluid passage of heat exchanger 122 may consist of an outer passage 184 defined in part by wall 186 and also in part by tube 156. Ridges 170 and 172 thus extend within outer passage 184 longitudinally, allowing fluid passed therethrough to flow in a generally undulating path. The second fluid passage of heat exchanger 122 may consist of an inner passage 182 defined by wall 186 and comprising the portion of carbon foam block 150 enclosed thereby. Heat may be exchanged between fluid flowing in inner passage 182 and fluid flowing in outer passage 184 across wall 186. Although it is contemplated that inner passage 182 may be an exhaust passage, whereas outer passage 184 may be a cooling air passage, such a configuration is not critical. For example, exhaust gas could be passed through outer passage 184, and cooling air passed through inner passage 182. Further, while it is contemplated that heat exchanger 122 may be an exhaust gas and cooling air heat exchanger, other cooling fluids such as water or engine coolant might be used. Similarly, heat exchanger 122 is not limited to use in an exhaust system at all, merely contemplated as well suited for such an application.

Wall 186 may be disposed approximately 3 mm inwardly from an outer periphery of foam block 150, for example, and may be an integral wall formed in a specialized process of manufacturing carbon foam block 150, as alluded to above. Wall 186 may comprise a closed-cell layer of carbon foam material, or a non-cellular region of carbon foam material, a mixture of the carbon types, or a third material altogether, as described herein. In one embodiment, wall 186 may be formed via a multi-stage baking and curing process of a pitch-based carbon foam. A pitch-based starting material may be placed in a mold of the desired shape, for example a cylindrical mold configured to mold passages 180 therein. Once the initial mold is filled, the starting material therein may be subjected to a relatively low temperature bake, sufficient to cause the carbon foam in the mold to set sufficiently that it may be removed from the mold and manipulated without substantial deformation. The initial, low temperature bake can cause the exterior of carbon foam material which contacts internal walls of the mold to form a fluid-tight, or substantially fluid-tight skin of non-cellular and/or closed cell carbon.

Next, the partially cured carbon foam block may be placed in a second, larger mold, and additional pitch based starting material for the carbon foam added around the exterior of the product produced in the first molding step. The second mold may be a cylindrical mold configured, for example, to mold ridges 170 and channels 172 into an exterior of the carbon foam block. Following filling of the second mold, the entire product may be subjected to another relatively low temperature bake similar to the initial low temperature bake. Finally, the block may be subjected to a high temperature bake in a final cure process, and assembled with the other components of heat exchanger 122. It should be appreciated that, rather than molding various features of foam block 150 such as passages 180 and ridges 170, these features may be machined on block 150 following the final cure.

When assembled with the other components of heat exchanger 122, outer passage 184 of carbon foam block 150, in conjunction with portions 154a and 154b of housing 142, forms a cooling air passage. Inner passage 182, in conjunction with portions 152a and 152b of housing 142, forms an exhaust gas passage. In particular, a rim 155 of each of portions 152a and 152b may be fluidly sealed with carbon foam block 150 in the region of wall 186 at opposite ends thereof, for example, via an adhesive. Engaging rim(s) 155 with carbon foam block 150 provides a fluid passage for exhaust gas through portion 152a, outer passage 184, and portion 152b, which is fluidly separate from inner passage 182. Thus, heat exchanger 122 might be substituted for heat exchanger 22 of FIG. 1, and the appropriate connections made between exhaust gas recirculation passage 36 and inner passage 182, as well as between cooling air passages 26 and 28 and outer passage 184.

INDUSTRIAL APPLICABILITY

Returning to FIG. 1, during operation of engine 12, exhaust gas will flow from manifold 16 through exhaust outlet passage 37. A portion of exhaust gas may be diverted via valve 24 to heat exchanger 22, and thenceforth via exhaust inlet 25 through each of exhaust gas portions 32 via manifold assembly 29. After passing through heat exchanger 22, cooled exhaust gas may be returned to intake manifold 14 via exhaust outlet 27 and passage 36. Cooling air from intake 30 may be simultaneously supplied to heat exchanger 22 via passage 26, and distributed among cooling air portions 24 via manifold assembly 29. Cooling air may then be expelled to ambient via manifold assembly 31 and outlet passage 28.

The use of cooling air rather than engine coolant allows heat exchangers according to the present disclosure to operate without increasing the heat load on an engine radiator. This provides advantages over known designs wherein exhaust gas is cooled by rejecting heat from the exhaust gas to engine coolant or water which is then returned to the engine radiator and cooled in a conventional manner. In addition, not only may engine radiators be made smaller in certain applications, (or maintained at the same size where they would otherwise be enlarged), but the plumbing formerly required to supply and return engine coolant or water from an exhaust gas cooler is not required. Moreover, the overall size of heat exchanger 22, 122 is reduced as compared to earlier systems.

A further advantage relates to the use of carbon foam in heat exchanger 22 rather than conventional metallic heat exchanger materials. As exhaust gas is cooled, a proportion of the exhaust gas can condense to a liquid form comprising an acidic, aqueous liquid. Such condensed exhaust gases have a tendency to corrode internal components of conventional metallic heat exchangers. Because carbon foam has been demonstrated to have at least some resistance to such corrosion, its use herein provides an exhaust gas cooler having improved corrosion resistance.

The present disclosure further provides improvements over known gas to gas exhaust gas cooling strategies with respect to volumetric throughput requirements for a given cooling efficacy. A carbon foam based heat exchanger as described herein can provide acceptable exhaust gas outlet temperatures at flow ratios approaching 1 lb of cooling air per 1 lb of hot gas. This reduces the amount of cooling air flow required to be provided to the system, as compared to conventional gas to gas exhaust gas coolers. Further still, certain shortcomings of liquid cooled exhaust gas heat exchangers are overcome. This disclosure proposes to use air as the cooling medium, in certain embodiments so leakage inside the heat exchanger tends not to be a detriment to the life of the engine.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while much of the present description discusses heat exchanger 22, 122 in the context of a gas to gas heat exchanger, it should be appreciated that in certain applications a fluid other than a gas, such as water, could be used to cool exhaust gases passed through loop 36. Further still, while carbon foam blocks are considered to represent a practical configuration for the carbon foam used to exchange heat between fluids in the heat exchanger, alternatives are contemplated such as thin carbon foam sheets. Other aspects, features and advantages will be apparent upon an examination of the attached drawings and appended claims.

What is claimed is:

1. An engine system comprising:
an engine;
an exhaust system coupled with said engine;
a heat exchanger coupled with said exhaust system and including a heat conducting carbon foam, said heat exchanger having an exhaust gas passage and a second passage, said exhaust gas passage and said second passage being configured to exchange heat between fluids therein at least in part via said foam;
wherein said engine comprises an internal combustion engine;
said heat exchanger comprises a gas to gas heat exchanger, said second passage comprising a cooling air passage fluidly separate from said exhaust gas passage and having an air inlet and an air outlet;
said heat conducting carbon foam comprises a carbon foam block disposed within at least one of said exhaust gas passage and said cooling air passage;
wherein said engine comprises a compression ignition engine, said exhaust system comprising an exhaust gas recirculation loop having said heat exchanger coupled therewith; and
wherein said heat exchanger comprises a housing including a plurality of exhaust gas portions each having an exhaust gas passage disposed therein, and a plurality of cooling air portions each having a cooling air passage disposed therein, said housing portions being in an alternating stacked arrangement.

2. A combustion exhaust system segment comprising:
a housing having a first fluid passage and a second fluid passage;
a heat conducting carbon foam disposed within at least one of said first and second fluid passages and configured to exchange heat with a fluid in the other of said first and second fluid passages;
said first and second fluid passages are fluidly separate, said combustion exhaust system segment comprising a heat conducting carbon foam disposed within each of said first and second fluid passages;
said heat conducting carbon foam comprises at least one carbon foam block positioned within said housing;
said housing comprises a metallic exhaust gas portion defining said first fluid passage, and a separate metallic cooling air portion defining said second fluid passage; and
said heat conducting carbon foam comprises a first foam block disposed within said exhaust gas portion and a second foam block disposed within said cooling air portion.

3. A combustion exhaust system segment comprising:
a housing having a first fluid passage and a second fluid passage;
a heat conducting carbon foam disposed within at least one of said first and second fluid passages and configured to exchange heat with a fluid in the other of said first and second fluid passages;
said first and second fluid passages are fluidly separate, said combustion exhaust system segment comprising a heat conducting carbon foam disposed within each of said first and second fluid passages;
said heat conducting carbon foam comprises at least one carbon foam block positioned within said housing; and
said housing comprises a plurality of similar exhaust gas portions each having a heat conducting carbon foam block disposed therein, and a plurality of similar cooling air portions each having a heat conducting carbon foam block disposed therein, said first and second portions being in an alternating stacked arrangement.

4. A combustion exhaust system segment comprising:
a housing having a first fluid passage and a second fluid passage;
a heat conducting carbon foam disposed within at least one of said first and second fluid passages and configured to exchange heat with a fluid in the other of said first and second fluid passages;
said first and second fluid passages are fluidly separate, said combustion exhaust system segment comprising a heat conducting carbon foam disposed within each of said first and second fluid passages;
said heat conducting carbon foam comprises at least one carbon foam block positioned within said housing;
said housing comprises a tubular housing having said first and second passages extending coaxially therein; and
said at least one carbon foam block comprises a tubular block having first and second ends and comprising an internal cylindrical wall fluidly separating said first and second passages, said block being fluidly sealed with said housing at each of said first and second ends.

5. An engine system comprising:
an engine;
an exhaust system coupled with said engine;
a heat exchanger coupled with said exhaust system and including a heat conducting carbon foam, said heat exchanger having an exhaust gas passage and a second passage, said exhaust gas passage and said second passage being configured to exchange heat between fluids therein at least in part via said foam; and
one of the exhaust gas passage and the second passage including a foam portion in the heat conducting carbon foam and at least one low pressure drop portion extending through the heat conducting carbon foam.

6. The engine system of claim 5 wherein:
said heat exchanger comprises a gas to gas heat exchanger, said second passage comprising a cooling air passage fluidly separate from said exhaust gas passage and having an air inlet and an air outlet; and
said heat conducting carbon foam comprises a carbon foam block disposed within each of said exhaust gas passage and said cooling air passage.

7. The engine system of claim 6 wherein said heat exchanger comprises a tubular housing having said exhaust gas passage and said cooling air passage extending coaxially therein, said carbon foam block being disposed at least partially within each of said exhaust gas and cooling air passages.

8. The engine of claim 5 wherein the carbon foam includes an integral wall that defines a portion of at least one of the exhaust gas passage and the second passage.

9. The engine of claim 8 wherein the integral wall comprises fluid tight carbon foam material.

10. The engine of claim 9 including carbon foam on both sides of the integral wall.

11. A method of exchanging heat between a combustion exhaust gas and another fluid comprising the steps of:

passing high temperature combustion exhaust gas through a first passage of a heat exchanger;

passing low temperature fluid through a second passage of the heat exchanger;

exchanging heat between the high temperature combustion exhaust gas and the low temperature fluid at least in part via a heat conducting carbon foam; and preventing an excessive pressure drop through the heat exchanger by forming the heat conducting carbon foam to include a foam portion and a low pressure drop portion through the heat conducting carbon foam.

12. The method of claim 11 wherein the step of exchanging heat comprises exchanging heat between the exhaust gas and the low temperature fluid via a heat conducting carbon foam block disposed within said first passage and another heat conducting carbon foam block disposed within said second passage.

13. The method of claim 11 including a step of forming the heat conducting foam block with a low temperature bake and a high temperature bake.

14. The method of claim 11 wherein the low pressure drop portion is formed via at least one of a molding process and a machining process.

15. The method of claim 11 wherein:

the step of passing high temperature combustion exhaust gas comprises diverting at least a portion of exhaust gas from an internal combustion engine through the first passage; and the step of passing low temperature fluid through the second passage comprises passing cooling air therethrough; and forming at least a portion of one of the first and second passages with an integral wall of fluid tight carbon foam material.

16. The method of claim 15 wherein the internal combustion engine comprises a compression ignition engine, the step of passing high temperature combustion exhaust gas further comprising a step of returning exhaust gas to the engine after the exchanging step.

17. A combustion exhaust system segment comprising:

a housing having a first fluid passage and a second fluid passage; and a heat conducting carbon foam disposed within at least one of said first and second fluid passages and configured to exchange heat with a fluid in the other of said first and second fluid passages; and one of the first passage and the second passage including a foam portion in the heat conducting carbon foam and at least one low pressure drop portion extending through the heat conducting carbon foam.

18. The combustion exhaust system segment of claim 17 wherein said first and second fluid passages are fluidly separate, said combustion exhaust system segment comprising a heat conducting carbon foam disposed within each of said first and second fluid passages.

19. The combustion exhaust system segment of claim 18 wherein said heat conducting carbon foam comprises at least one carbon foam block positioned within said housing; and the first and second passages being at least partially defined by an integral fluid tight wall of carbon foam material.

20. The combustion exhaust system segment of claim 19 wherein said housing comprises a tubular housing having said first and second passages extending coaxially therein.

\* \* \* \* \*